United States Patent Office 2,797,904
Patented July 2, 1957

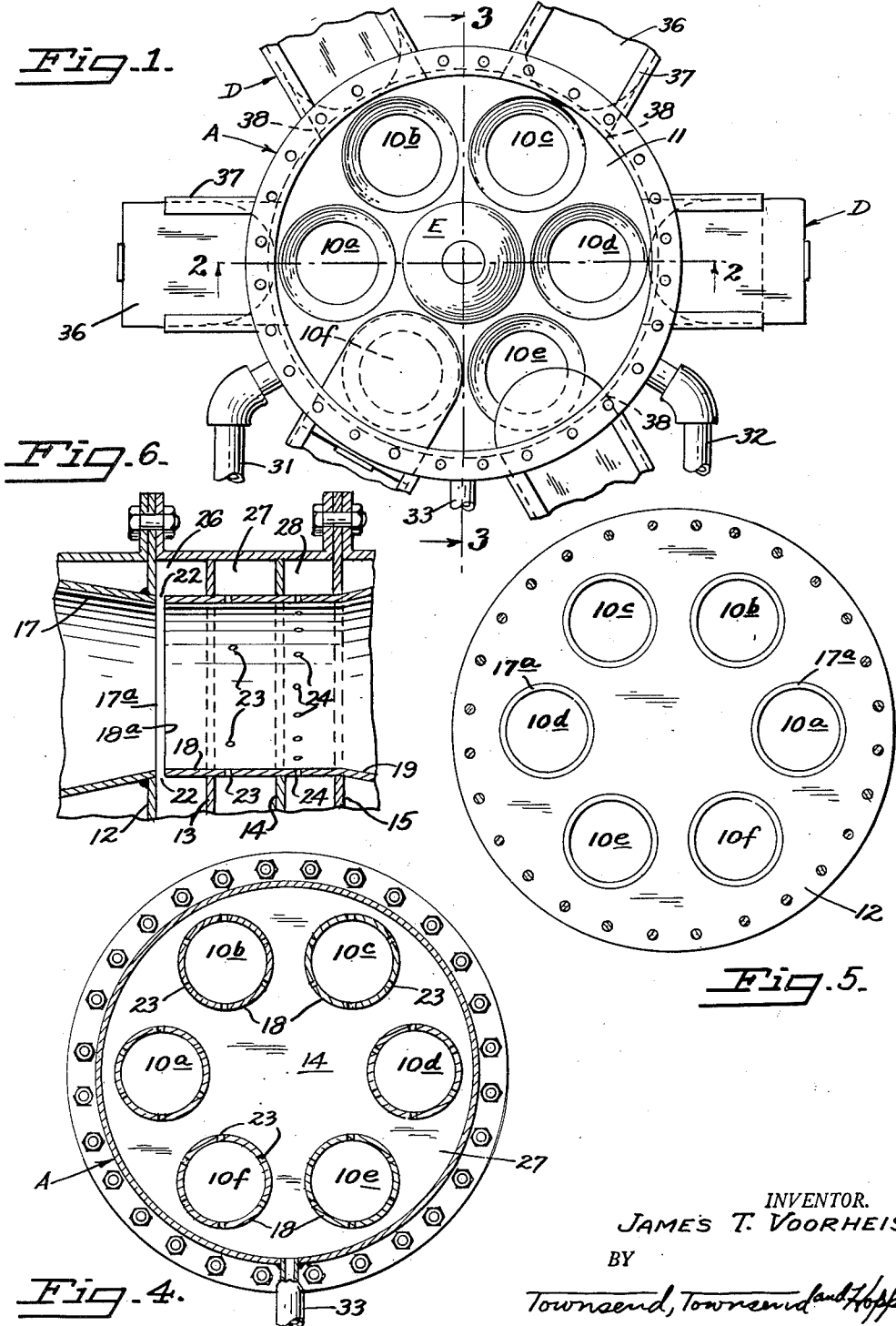

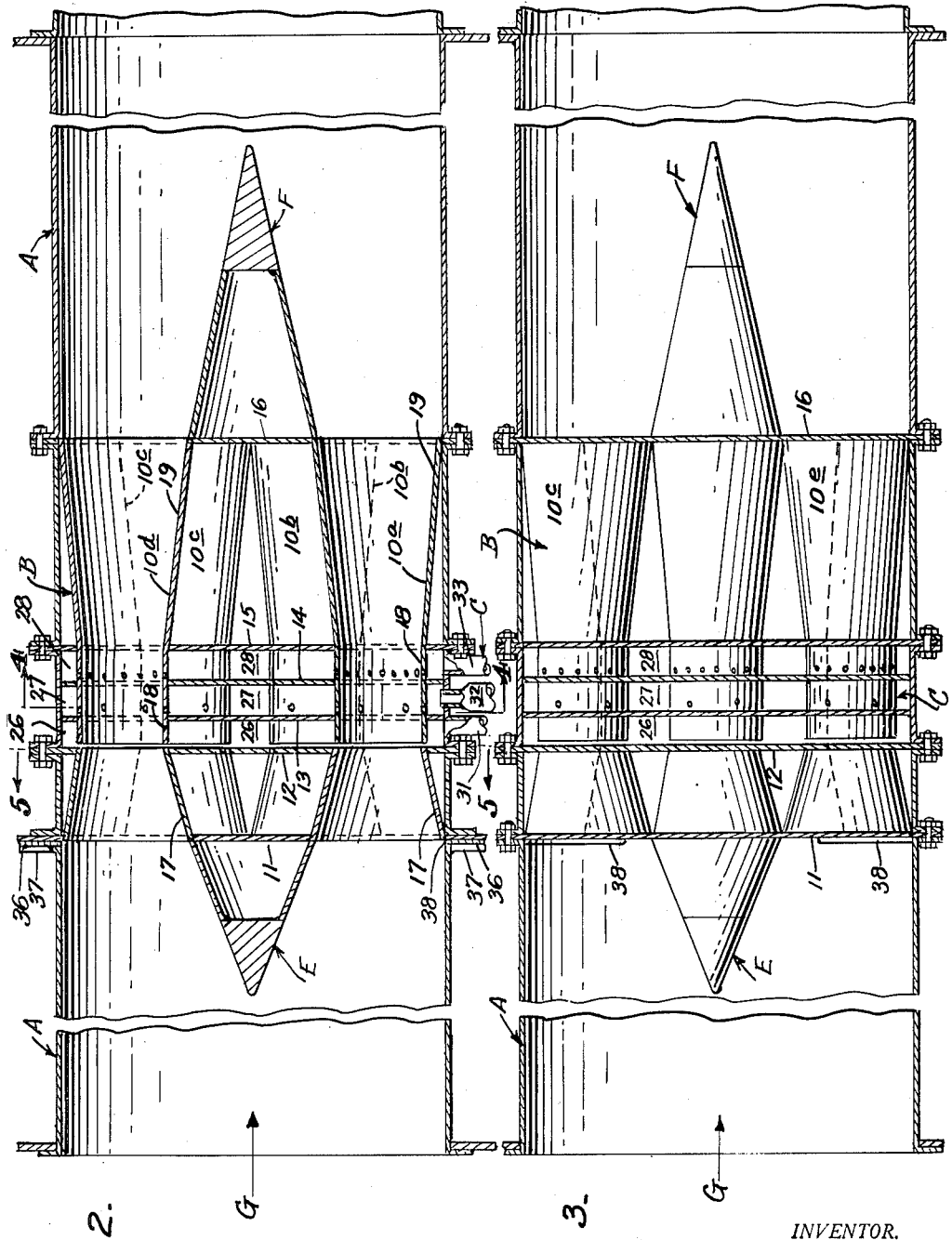

2,797,904

MULTIPLE VENTURI SCRUBBER

James T. Voorheis, Oakland, Calif.

Application November 27, 1953, Serial No. 394,638

2 Claims. (Cl. 261—23)

This invention relates to a new and improved venturi type scrubber unit, and more particularly said invention relates to a novel multiple venturi scrubber.

Heretofore there have been various ways proposed and used for removing airborne particles such as dust, smoke, mist, odors, or the like from gas streams, such as, for example, exhaust gases from burners or furnaces. Included among these various prior art means have been disk evaporators, cascade towers, cyclonic separators, electrostatic separators, and venturi type scrubbers. Some of these prior art systems, such as the cascade towers, for example, have been found effective in the removal of rather large (over micron size) particulate matter from gas streams; whereas other systems, including, for example, the cyclonic and electrostatic separators as well as conventional single venturi scrubbers, have been constructed so as to remove particles of micron and sub-micron size. In this connection it is pointed out that there are many instances where it is practical or necessary to effect a substantially complete removal of all airborne particles carried in a dirty gas stream, including particles as small as 0.1 micron diameter or less. One instance where it becomes important to effect a nearly 100% removal of colloidally suspended particles is in the case where the gas stream contains poisonous fumes, such as mintue particles of lead, arsenic, or the like.

Although both the electrostatic and cyclonic separators have been used advantageously in certain commercial installations for removing particulate matter of micron and sub-micron size from furnace gases and the like, these systems, generally speaking, are quite expensive to construct, install, and operate and, for these and other reasons, are not economically or practically feasible in many types of operations. The more conventional single venturi scrubber, although relatively simpler in construction and operation than the cyclonic and electrostatic separators, has been found to have serious limitations in maximum load capacity. Moreover, conventional single venturi-type scrubbers, in many instances, have also been found to provide inefficient scrubbing action in removing the desired or necessary quantity of particulate matter from a gas stream.

It is a principal object of the present invention to provide a multiple venturi type scrubber which, more specifically, comprises a plurality of venturis arranged in side-by-side circular formation concentrically within a single conduit or casing through which the dirty gases to be scrubbed are caused to flow at high velocity. Each of the venturis comprising the present device may be of relatively small diameter, and each is provided with one or more means for spraying sufficient quantities of scrubbing liquid across its throat so as to insure liquid contact and scrubbing of the entire gas stream.

It is another object of the present invention to provide a multiple venturi scrubber which incorporates novel means to selectively vary the efficient load capacity of said scrubber to meet varying actual load conditions. In this connection, it is pointed out that in a given plant installation there may occur instances where the volume of dirty gas to be scrubbed by a single scrubber unit may vary considerable; and it has been determined that maximum scrubbing efficiency of a venturi scrubber depends on several factors, among which include the volume of gas which passes through the venturi as well as the velocity at which it flows. Thus, it is desirable to be able to selectively vary the efficient load capacity of such a unit according to the volume of gas being scrubbed at a particular time. More specifically, the present device is so constructed that it may be operated at maximum load capacity with all of its venturi scrubbers open and in flow communication with the dirty gas stream whereby all venturis operate simultaneously to scrub said gas. Under such conditions the blower and/or suction fans of the system would also likely be operated at close to full load capacity. On the other hand, the present device is so constructed that during curtailed operations when only a fraction of the maximum load on the system is actually being carried, any one or several of the plurality of individual venturis may be closed and rendered inoperative so as to actually utilize only the number of venturis required to efficiently accommodate the actual load being carried. This, in turn, permits the blower and/or suction fans to be economically operated at a correspondingly reduced fraction of their maximum load capacity.

Another object of the invention is to provide a multiple venturi scrubber of the type briefly mentioned above in which each venturi is provided with means for injecting scrubbing liquid in different spray patterns and under varying pressures across the throat of the venturi to insure maximum scrubbing of all areas of a gas stream. In this connection there is evidence which indicates that a better and more efficient scrubbing action throughout all areas (i. e., inner and outer layers) of a gas stream is effected when the stream is impelled through several different spray patterns having different flow rates and under different pressures, than when said stream is passed through only one spray pattern at constant pressure according to more conventional practice employing single venturi scrubbers.

Another object of the invention is to provide a multiple venturi scrubber capable of fulfilling all of the foregoing objects and advantages and yet which may be manufactured, installed, and operated relatively economically.

Other numerous objects and advantages of the present invention will become apparent upon reading the following specification in which similar characters of reference represent corresponding parts in each of the several views.

In the drawings:

Fig. 1 is a front end elevational view of the scrubber.

Fig. 2 is a longitudinal sectional view taken on line 2—2 of Fig. 1.

Fig. 3 is a longitudinal sectional view taken on line 3—3 of Fig. 1.

Fig. 4 is a vertical sectional view taken on line 4—4 of Fig. 2.

Fig. 5 is a vertical sectional view taken on line 5—5 of Fig. 2.

Fig. 6 is an enlarged fragmentary view in section of one of the venturis.

Referring now more particularly to the drawings, the embodiment of the invention therein shown comprises, generally, a casing or flue A through which the dirty gas stream to be scrubbed is impelled at high velocity, a plurality of individually operative venturi scrubbers B, a plurality of liquid jackets and associated spray systems C, selective venturi closing means D, and front and rear streamlining cones, indicated generally at E and F, respectively.

In a commercial installation incorporating the present device, the tubular casing or flue A would be connected to the main gas flue (such as the exhaust gas flue of a burner or furnace) carrying the stream of dirty gas to be scrubbed. Such installation would also include conventional blower or suction fans (or both) mounted in the gas carrying flue to impel the dirty gas to be scrubbed at relatively high velocities (equivalent to air drifts of between 15 to 20 inches) through casing A in the direction of arrow G, and a suitable conventional sump, or equivalent means, would also be provided to collect the scrubbing liquid after it is sprayed through the venturis during operation of the device.

In the embodiment of the invention shown, the device comprises six venturi scrubber units disposed in side-by-side circular formation concentrically within casing A. The six venturis are designated generally by the reference characters 10a, 10b, 10c, 10d, 10e, and 10f to distinguish them in the drawings. For the sake of brevity it will suffice to remark that all of the venturis are substantially identical in construction and operation, and accordingly the component parts of each are numbered similarly.

The venturis are mounted and supported within casing A by a plurality of partitioning plates indicated at 11, 12, 13, 14, 15, and 16, which said plates are appropriately apertured to receive and support the venturi tubes at various positions along the lengths of said tubes.

Each of the venturi tubes comprises, more specifically, a flared approach or mouth opening 17, a constricted throat portion 18, and an outwardly rearwardly flared discharge portion 19. Preferably, and for reasons which will more fully appear hereinafter, the approach portions 17 of the tubes are supported and spaced a slight distance (such as 1/16 of an inch) from their associated adjacent throat portions. Thus, Fig. 6 discloses the forward end 18a of neck portion 18 disposed a slight distance rearwardly of plate 12 and edge 17a of approach portion 17 of the tube. Such an arrangement provides an annular opening or slot 22 extending around the entire periphery of the forward portion of the throat, the function of which will be explained hereinafter. Moreover, the throat portion of each tube is additionally formed with two separate annular groups of nozzle or spray openings, such as indicated at 23 and 24, respectively. Group 23 preferably comprises a series of from four to six spray openings spaced equidistantly circumferentially about the throat 17 at a point located between partitioning plates 13 and 14. The group of spray openings 24, preferably comprising eighteen to twenty-four in number, are equidistantly spaced about the circumference of the rearward portion of the venturi throat between partitioning plates 14 and 15.

Partitioning plates 12, 13, 14, and 15, in turn, function to divide or partition casing A into three separate chambers or jackets, indicated at 26, 27, and 28, respectively. It is observed that each of these jackets completely surrounds each of the venturi tubes whereby annular slot 22, located at the forward end of the venturi throat, is in communication with forward chamber or jacket 26, and whereby spray opening groups 23 and 24 of each tube are in respective communication with jackets 27 and 28.

As heretofore mentioned, it is an object of the invention to provide in a multiple venturi scrubber means for injecting across the throat of each venturi a plurality of liquid streams having different spray characteristics to insure maximum scrubbing action of all parts of a gas stream flowing through each tube. It is with this end in view that the three separate groups of spray openings 22, 23, and 24 are constructed differently so as to give different spray patterns. In addition, I also prefer to introduce liquid spray through each group of openings under different liquid pressures. Accordingly, I prefer to independently connect liquid jackets 26, 27, and 28 to different liquid pressure sources (not shown) such as conventional liquid pumps. In the arrangement shown, jacket 26 is preferably connected via supply line 31 to a source of liquid under pressure of between 3 to 50 p. s. i. Liquid entering jacket 26 will continuously spray across the throat of each venturi through gap or slot 22 thereof in a solid liquid curtain or sheet. Jacket 27 is preferably connected to a source of liquid under pressure of between 25 to 50 p. s. i. via conduit 32. Liquid entering jacket 27 will be continuously injected across the throat of each venturi through nozzle openings 23 thereof. Jacket 28 is preferably connected via conduit 33 to a source of the liquid under pressure of around 5 p. s. i., whereby liquid entering jacket 28 will, of course, be continuously introduced through jet openings 24 in each venturi.

In order to provide at least partial streamlining for the gas stream as it both enters and leaves the venturi tubes, I provide a forward cone E and rearward cone F. More specifically, the gas stream flowing through casing A under high velocity in the direction of arrow G will be diverted to a considerable extent in streamlined flow toward the venturis B by cone E. Similarly, rearwardly projecting cone F will materially lessen the likelihood of back eddies occurring at the discharge end of said venturis.

As above pointed out, it is also an object and advantage of the invention to provide in a multiple venturi scrubber means for selectively varying the efficient load capacity of the scrubber according to the actual load or volume of gas being carried by the system at a given time. With this end in view, I provide a plurality of independently operable gate valves 36 for selectively opening and closing flow communication between casing A and each of the venturis. Each said gate valve 36 may be slidably supported in an outwardly projecting guideway 37, in registry with an appropriate slotted opening 38 formed through said casing, adjacent the mouth opening of an associated venturi, whereby each said gate valve may be slidably moved in its associated guideway and slot to close off flow of gas through an associated venturi. Thus, it is seen that the gate valves 36 provide an effective means for selectively utilizing any desired number of the venturis in accordance with the actual load being carried by the system. Accordingly, when the volume of dirty gas to be scrubbed flowing through the system is less than the maximum load capacity of said system, one or several of the venturis may be closed off through operation of the gate valves. This, in turn, permits the fans normally installed within the system, as aforesaid, to be operated at less than their maximum load capacity, thereby resulting in greater economy of operation.

Although the present invention has been described in some detail by way of example and illustration for purposes of clarity of understanding, it is understood that certain changes and modifications may be made within the spirit of the invention as limited only by the scope of the claims appended hereto.

I claim:

1. A scrubber unit comprising in combination with an annular casing through which the gaseous medium to be scrubbed is adapted to flow: a plurality of spaced parallel transverse partitions mounted interiorly of said casing; said partitions apertured to receive and support a plurality of venturi tubes in spaced circular formation concentrically within said casing; said transverse partitions defining a plurality of separate liquid jackets each substantially completely circumferentially surrounding each said venturi tube; a plurality of separate annular groups of spray openings formed through the body of each venturi tube; each group of said openings in communication with a respectively associated jacket; means for connecting each jacket with a source of scrubbing liquid located exteriorly of said casing; and means for individually selectively opening and closing gas flow communication between the interior of said casing and each venturi tube.

2. A scrubber unit according to claim 1 and wherein there is provided a sliding valve gate in association with each venturi tube for selectively opening and closing gas flow communication between the interior of said casing and each venturi tube.

References Cited in the file of this patent

UNITED STATES PATENTS

| | | |
|---|---|---|
| 1,385,884 | Moss | July 26, 1921 |
| 1,608,416 | Newton | Nov. 23, 1926 |
| 1,741,519 | Huff | Dec. 31, 1929 |
| 1,803,956 | Bergman | May 5, 1931 |
| 1,810,131 | Daily | June 16, 1931 |
| 2,088,691 | Dill | Aug. 3, 1937 |
| 2,215,707 | Matanovich-Manov et al. | Sept. 24, 1940 |
| 2,519,618 | Wilson et al. | Aug. 22, 1950 |
| 2,523,126 | Long | Sept. 19, 1950 |
| 2,702,699 | Kinney | Feb. 22, 1955 |